United States Patent
Ramirez et al.

[19]

[11] Patent Number: 6,126,024
[45] Date of Patent: Oct. 3, 2000

[54] CONVERTIBLE CUP FOR VACUUM BOTTLE

[75] Inventors: Frankie Ramirez; Chris Gielow; Ann Marie Conrado, all of Chicago; Craig Scherer, Wilmette, all of Ill.

[73] Assignee: The Thermos Company, Schaumburg, Ill.

[21] Appl. No.: 09/216,176

[22] Filed: Dec. 18, 1998

[51] Int. Cl.[7] .............................. A47J 41/02; B65D 83/00
[52] U.S. Cl. .................. 215/12.1; 215/329; 215/387; 215/DIG. 7; 220/23.86; 220/630
[58] Field of Search .................. 215/329, 387, 215/DIG. 7, 386, 228, 12.1; 220/521, 522, 23.86, 630, 212

[56] References Cited

U.S. PATENT DOCUMENTS

| | | | |
|---|---|---|---|
| 1,509,524 | 9/1924 | Morrison | 220/212 |
| 1,585,524 | 5/1926 | Bass | 220/212 X |
| 1,721,506 | 7/1929 | Bass | 220/212 X |
| 2,487,728 | 11/1949 | Quiring | 215/329 X |
| 2,862,637 | 12/1958 | Heldfond | 215/228 |
| 3,017,047 | 1/1962 | Payson et al. | 215/DIG. 7 |
| 3,076,575 | 2/1963 | Leslie-Smith | 215/DIG. 7 |
| 3,079,037 | 2/1963 | Schecter | 220/212 |
| 3,297,187 | 1/1967 | Thiesen | 215/329 X |
| 3,373,888 | 3/1968 | Fuller | 215/329 X |
| 5,586,676 | 12/1996 | Lynd | 215/387 X |

*Primary Examiner*—Stephen P. Garbe
*Assistant Examiner*—Tri M. Mai
*Attorney, Agent, or Firm*—Wood, Phillips, VanSanten, Clark & Mortimer

[57] ABSTRACT

A convertible cup, connectable to a vacuum bottle, is provided including a dome-shaped cover part and a cup-shaped vessel part. The dome-shaped cover part has first threads, a first opening for the dispensing of liquids, and a second opening for the intake of air. A cup-shaped vessel part has second threads suitable for connection to the first threads. When the second threads are connected to the first threads, the cup-shaped vessel part may be nested inside the dome-shaped cover part thereby forming a cup with an open top. The cup-shaped vessel part also has third threads suitable for connecting to the first threads. When the third threads are connected to the first threads, the cup-shaped vessel part and the dome-shaped cover part form a chamber. The convertible cup may also include fourth threads on the dome-shaped vessel part for connecting to a vacuum bottle. Furthermore, the dome-shaped vessel part has a base sized to fit into a cup holder when the cup-shaped vessel part is connected to the dome-shaped cover part to form a chamber.

10 Claims, 2 Drawing Sheets

CONVERTIBLE CUP FOR VACUUM BOTTLE

FIELD OF THE INVENTION

This invention relates to a vacuum bottle, and more particularly, to a convertible cup for a vacuum bottle.

BACKGROUND OF THE INVENTION

A typical vacuum bottle has a cup-shaped cover for protecting the opening and the stopper of the vacuum bottle from dirt and from physical impact. The cover, when removed from the bottle, may also be used as a cup from which the beverage inside the vacuum bottle can be consumed. However, when the cover is used as a cup and filled with a beverage from the vacuum bottle, any small movement or jarring can cause the beverage to spill. In cases where the beverage is hot, such as with hot chocolate or coffee, this could burn the user's hands as well as stain objects in the environment and waste the beverage. Furthermore, when used as a cup, the cover is inconvenient to use in an automobile as well. As it is preferred to use both hands while driving, it would be desirable to have a cover which can be set down. Unfortunately, current covers do not fit into existing automobile cup holders.

Thus, there is a need for a new and improved cover for a vacuum bottle that, when used as a cup, can protect a user's hands by preventing spillage of the beverage. There is a further need for such a cover that will fit into existing automobile cup holders.

SUMMARY OF THE INVENTION

It is the principal object of the invention to provide a new and improved cover for use with a vacuum bottle. According to one aspect of the invention, a convertible cup comprising a domed-shaped cover part and a cup-shaped vessel part is provided. The domed-shaped cover part has a first mechanical connection, a first opening for the dispensing of liquids, and a second opening for the intake of air. The cup-shaped vessel part has a second mechanical connection suitable for connection to the first mechanical connection, which when the second mechanical connection is connected to the first mechanical connection, the cup-shaped vessel part is nested inside the domed-shaped cover part, thereby forming a cup with an open top. The cup-shaped vessel part also has a third mechanical connection which is suitable for connection to the first mechanical connection which, when the third mechanical connection is connected to the first mechanical connection, the cup-shaped vessel part and the domed-shaped cover part form a chamber.

According to a further aspect of the invention, the convertible cup has a fourth mechanical connection on the cup-shaped vessel part for connecting to a vacuum bottle. In a yet further aspect of the invention, the cup-shaped vessel part of the convertible cup has a base sized to fit into a cup holder when the cup-shaped vessel part is connected to the dome-shaped cover part to form a chamber.

According to another aspect of the invention, a vacuum bottle has a vessel with a mouth for the storage of liquids, a stopper for covering the mouth thereby preventing liquids from escaping, a first mechanical connection, and a cup connected to the vacuum bottle for enclosing the stopper. The cup has a domed-shaped cover part and a cup-shaped vessel part. The dome-shaped cover part has a second mechanical connection, a first opening for the dispensing of liquids, and a second opening for the intake of air. The cup-shaped vessel part has a third mechanical connection which is suitable for connection to the second mechanical connection which, when the third mechanical connection is connected to the second mechanical connection, the cup-shaped vessel part is nested inside the dome-shaped cover part, thereby forming a cup with an open top. The cup-shaped vessel part also has a fourth mechanical connection which is suitable for connection to the second mechanical connection which, when the fourth mechanical connection is connected to the second mechanical connection, the cup-shaped vessel part and the dome-shaped cover part form a chamber. The cup-shaped vessel further has a fifth mechanical connection on the vessel part for connecting the cup to the first mechanical connection.

In accordance with yet another aspect of the invention, a two-part convertible cup has a tapered dome-shaped cover part with a recessed end and a cup-shaped vessel part of a stepped cylindrical configuration, including a reduced diameter closed end and an enlarged diameter open end. The tapered dome-shaped cover part has a first mechanical connection remote from the end, a first opening in the end for dispensing liquids, and a second opening in the end and spaced from the first opening for the intake of air to serve as a vent. The vessel part has a second mechanical connection suitable for connecting to the first mechanical connection, wherein when the second mechanical connection is connected to the first mechanical connection, the reduced diameter closed end is nested inside the cover part thereby forming a cup with an open top. The cup-shaped vessel part also has a third mechanical connection spaced from the second mechanical connection and suitable for a connection to the first mechanical connection, wherein when the third mechanical connection is connected to the first mechanical connection, the dome-shaped cover part and the cup-shaped vessel part form a chamber bounded by the recessed end and the reduced diameter closed end. In a further aspect of the invention, the first connection, the second connection, and the third connection each comprise threads. In another aspect of the invention, the convertible cup has a fourth mechanical connection for connecting to a vacuum bottle.

According to another aspect of the invention, a two-part convertible cup has a dome-shaped cover part with a cylindrical open end section, a tapered central section, and a cylindrical reduced diameter recessed end. The two-part convertible cup also has a vessel part of a stepped cylindrical configuration, including a reduced diameter cylindrical section with a closed end sized to fit into a cup holder, and an enlarged diameter cylindrical section with a gripping surface and an open end. The dome-shaped cover part has a first threaded mechanical connection on the inner surface of the cylindrical open end section, a first opening in the recessed end for dispensing of liquids, and a second opening in the recessed end on the same plane of, generally diametrically opposed from, and of smaller size than the first opening for the intake of air to serve as a vent. The cup-shaped vessel part has a second threaded mechanical connection on an outer surface of said enlarge diameter section proximate to the reduced diameter cylindrical section suitable for connection to the first threaded mechanical connection, wherein when the first threaded mechanical connection is connected to the second threaded mechanical connection, the reduced diameter cylindrical section is nested inside the dome-shaped cover part with the closed end of the cup-shaped vessel part being in close proximity to the recessed end of the dome-shaped cover part, thereby forming a cup with an open top. The vessel part also has a third threaded mechanical connection proximate to the enlarged diameter open end suitable for connection to the first threaded connection, wherein when the first threaded mechanical connection is connected to the third threaded mechanical connection, the dome-shaped cover part rests relatively above the vessel part to form a chamber bounded by the recessed end and the reduced diameter closed end.

In a further aspect of the invention, the convertible cup has a fourth threaded mechanical connection on an inner surface of and proximate to the open end of the enlarged diameter section of the cup-shaped vessel part for connecting to a vacuum bottle.

Other objects and advantages will become apparent from the following specification taken in connection with the accompanying drawings.

DETAILED DESCRIPTION OF THE PREFERRED EMBODIMENT

Figure 1:
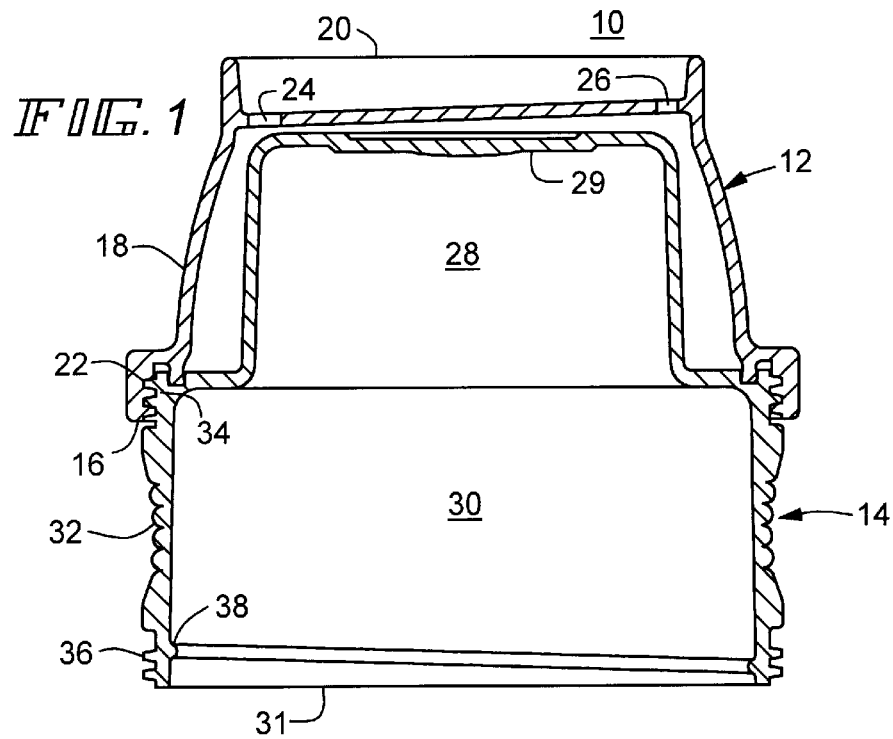
FIG. 1 is a view of a convertible cup in a first configuration having a cup-shaped vessel part nested inside a dome-shaped cover part to form a cup with an open top in accordance with the invention.

An exemplary embodiment of a convertible cup made according to the invention is described herein and is illustrated in the drawings in connection with the convertible cup for covering the stopper of a vacuum bottle. However, it should be understood that the invention may find utility in other applications and that no limitation to the use as a convertible cup is intended, except insofar as expressly stated in the appended claims.

Figure 2:
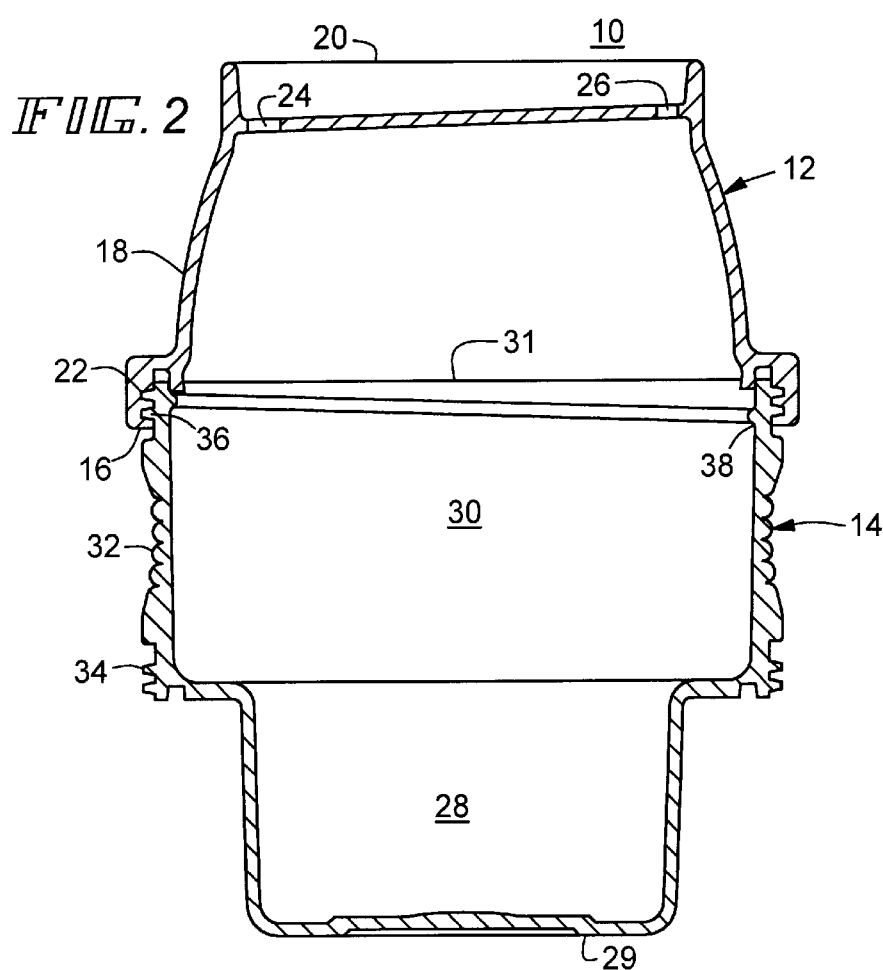
FIG. 2 is a view of a convertible cup in a second configuration having a dome-shaped cover part above and connected to a cup-shaped vessel part to form a chamber in accordance with the invention.

With reference to FIG. 1, a convertible cup 10 is shown having a dome-shaped cover part, generally designated 12 and a cup-shaped vessel part, generally designated 14. The dome-shaped cover part 12 has a cylindrical open end section 16, a tapered central section 18, and a cylindrical reduced diameter recessed end 20. The dome-shaped cover part 12 further has interior threads 22 defining a first mechanical connection on the inner surface of the cylindrical open end section 16, a first or drink opening 24 in the recessed end 20 for dispensing of liquids, and a second or vent opening 26 in the recessed end 20 generally diametrically opposed from, and of smaller size than the drink opening 24 for the intake of air to prevent formation of a vacuum. The cup-shaped vessel part 14 has a stepped cylindrical configuration, including a reduced diameter cylindrical section 28 with a closed end 29, an enlarged diameter cylindrical section 30 with an open end 31, and an exterior gripping surface 32. The reduced diameter section 28 is sized to both fit into a conventional cup holder of the sort found in vehicles and to nest within the tapered section 18 of the cover part 12. The cup-shaped vessel part 14 also has exterior threads 34 defining a second mechanical connection on an outer surface of the enlarged diameter section 30, the second threads 34 are at the reduced diameter cylindrical section 28. The threads 34 may be threaded onto the threads 22 to nest the vessel part 14 in the cover part 12 as shown in FIG. 1. The vessel part 14 also has exterior threads 36 defining a third mechanical connection at the open end 31 of the enlarged diameter cylindrical section 30 which are also suitable for threaded engagement with the first threads 22 to provide a substantially closed vessel as shown in FIG. 2. In a further embodiment, the convertible cup 10 includes a fourth set of threads 38 defining a fourth mechanical connection which is on the inner surface and at the open end 31 of the enlarged diameter cylindrical section 30 of the vessel part 14 for connection to a vacuum bottle as will be described in greater detail hereinafter.

When the first threads 22 are connected to the second threads 34, the convertible cup is in a first configuration (shown in FIG. 1) where the reduced diameter cylindrical section 28 is nested inside the dome-shaped cover part 12, with the closed end 29 of the reduced diameter cylindrical section 28 being in close proximity to the recessed end 20 of the dome-shaped cover part 12, thereby forming a cup with an open top.

With reference to FIG. 2, the convertible cup 10 is shown in a second configuration where the first threads 22 are connected to the third threads 36, such that the dome-shaped cover part 12 is secured to the top of the cup-shaped vessel part 14 to form a substantially closed chamber bounded by the recessed end 20 and the closed end 29 of the reduced diameter cylindrical section 28. In this configuration, spillage of a beverage in the convertible cup is substantially avoided while allowing consumption of the beverage through the drink opening 24.

Figure 3:
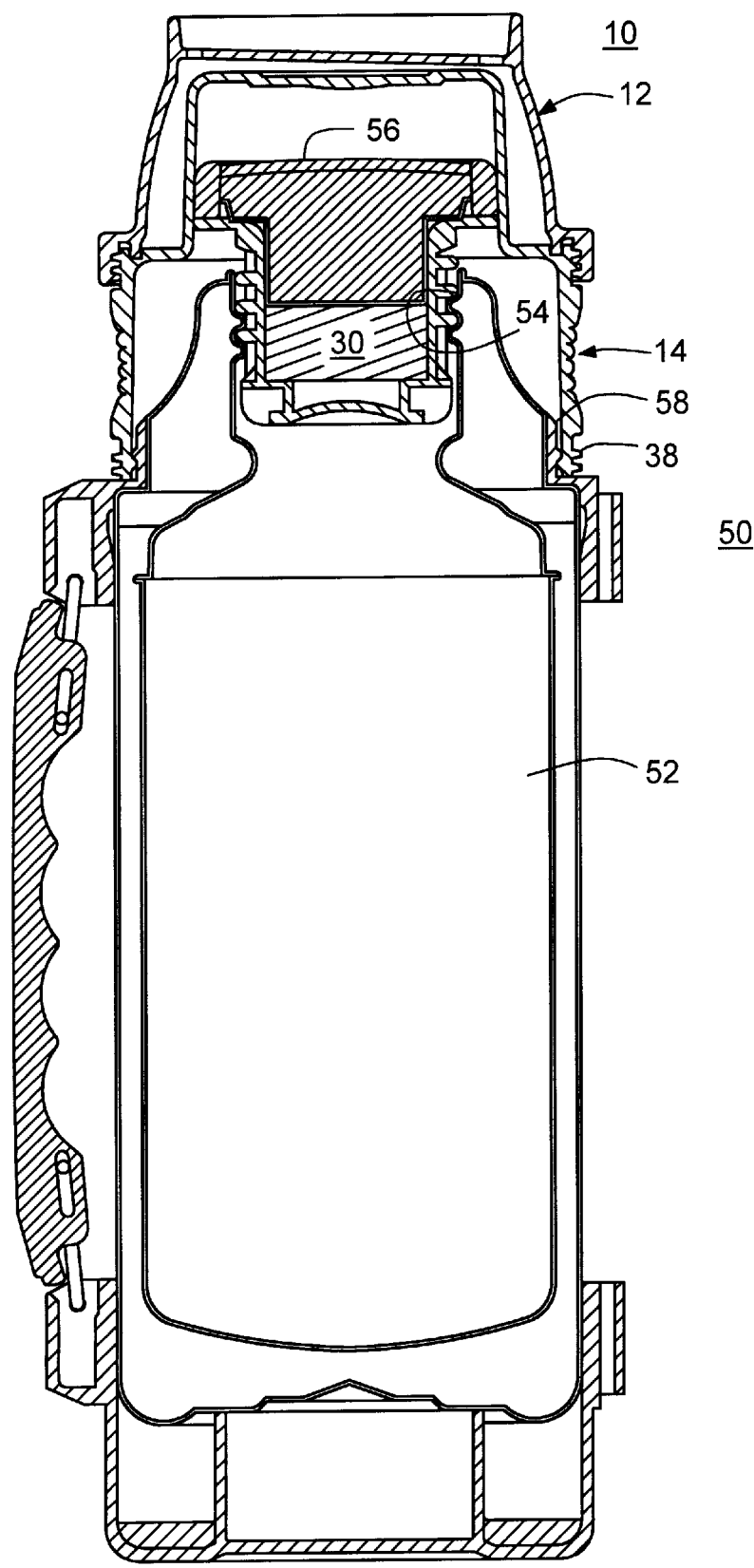
FIG. 3 is a view of a vacuum bottle with the convertible cup mounted thereon.

FIG. 3 shows a vacuum bottle 50 having a vessel 52 for the storage of liquids and a mouth 54. The vacuum bottle 50 also has a conventional stopper 56 for closing the mouth 54 thereby preventing liquids from escaping, external threads 58 defining a first mechanical connection, and the convertible cup 10 referenced in FIGS. 1 and 2 mounted thereon for enclosing the stopper 56. The external threads 58 of the vacuum bottle 50 are for threaded engagement with the fourth set of threads 38 of the convertible cup 10, thereby removably securing the convertible cup 10 to the vacuum bottle 50.

The convertible cup 10 in the configuration shown in FIG. 1, is suitable for connecting to the vacuum bottle 50, thereby covering the stopper 56 and protecting the stopper 56 and the mouth 54 from dirt and physical impact. In use, the convertible cup 10 may be removed from the vacuum bottle 50 by rotating the convertible cup 10, thereby unscrewing the convertible cup 10 from the vacuum bottle 50. In this configuration, the convertible cup 10 also may be used as an ordinary cup, where the beverage from the bottle 50 is poured into the open end 31 of the enlarged diameter cylindrical section 30 of the cup-shaped vessel part 14. In this way, the convertible cup 10 is convenient for a user as no additional utensils are necessary for the user to consume a beverage from the vacuum bottle 50.

To place the convertible cup 10 in the second configuration shown in FIG. 2, the user may remove the convertible cup 10 from the vacuum bottle 50 and separate the dome-shaped cover part 12 from the cup-shaped vessel part 14 by holding the cup-shaped vessel part 14 in one hand while rotating the dome-shaped cover part 12 with the other hand, thereby unscrewing the dome-shaped cover part 12 from the cup-shaped vessel part 14. The user may then fill the cup-shaped vessel part 14 with a beverage, align the first threads 22 with the third threads 36 by placing the dome-shaped cover part 12 over the cup-shaped vessel part 14, and rotate the dome-shaped cover part 12, thereby screwing the dome-shaped cover part 12 to the cup-shaped vessel part 14 to form a substantially closed chamber. The user may then drink the beverage using the drink opening 24, and the vent opening 26 prevents formation of a vacuum as the beverage exits the chamber. As the dome-shaped cover 12 completely covers the cup-shaped vessel part 14, any slight movement or jarring of the convertible cup 10 will not cause spillage of the beverage, and the adverse effects thereof. Additionally, the convertible cup in this second configuration prevents insects, leaves, dirt and other objects from entering the vessel port 14, which would spoil the beverage. Further yet, the convertible cup 10 in this configuration is able to be placed into existing automobile cup holders as the reduced diameter cylindrical section 28 is sized to fit into such cup holders, allowing increased safety and added convenience for the driver of an automobile. In addition, the gripping surface 32 provides the user with an exceptional grip on the convertible cup 10 thereby reducing the chances of the convertible cup 10 slipping from the user's hand when in use.

Although the mechanical connections 22, 34, 36 and 38 are described as threaded connections, in some cases, other connection techniques, such as, but not limited to, a frictional connection, a bayonet connection, a detent connection, and a snap connection may be used.

Still other aspects, objects and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

We claim:

1. A convertible cup comprising:
   a dome-shaped cover part having an open end and an opposite end connected by a central section,
   a first mechanical connection proximate said open end,
   a first opening in said opposite end for the dispensing of liquids, and
   a second opening in said opposite end spaced from said first opening for the intake of air; and
   a cup-shaped vessel part having a second mechanical connection suitable for connection to said first mechanical connection, which when said second mechanical connection is connected to said first mechanical connection, said cup-shaped vessel part is nested inside said dome-shaped cover part thereby forming a cup with an open top, and
   a third mechanical connection separate and spaced from said second mechanical connection suitable for connection to said first mechanical connection, which when said third mechanical connection is connected to said first mechanical connection, said cup-shaped vessel part and said dome-shaped cover part form a chamber.

2. The convertible cup of claim 1 further comprising a fourth mechanical connection on said vessel part for connecting to a vacuum bottle.

3. The convertible cup of claim 1 wherein said vessel part is of stepped cylindrical configuration including an enlarged diameter open end, and a reduced diameter closed end sized to fit into a cup holder when said cup-shaped vessel part is connected to said dome-shaped cover part to form a chamber.

4. A vacuum bottle comprising:
   a vessel with a mouth for storage of liquids;
   a stopper for closing said mouth thereby preventing liquids from escaping;
   a first mechanical connection proximate to said mouth;
   a cup connectable to said vacuum bottle for enclosing said stopper, said cup comprising
      a dome shaped cover part having
         a second mechanical connection,
         a first opening for the dispensing of liquids, and
         a second opening for the intake of air, and
      a cup shaped vessel part having
   a third mechanical connection suitable for connection to said second mechanical connection, which when said third mechanical connection is connected to said second mechanical connection, said cup shaped vessel part is nested inside said dome shaped cover part thereby forming a cup with an open top, and
   a fourth mechanical connection suitable for connection to said second mechanical connection, which when said fourth mechanical connection is connected to said second mechanical connection, said cup shaped vessel part and said dome shaped cover part form a chamber, and
   a fifth mechanical connection on said vessel part for connecting said cup to said first mechanical connection.

5. A two part convertible cup comprising:
   a tapered dome shaped cover part with a recessed end and having
      a first mechanical connection, remote from said end,
      a first opening in said end for dispensing liquids, and
      a second opening in said end and spaced from said first opening for the intake of air to serve as a vent;
   a cup shaped vessel part of a stepped cylindrical configuration including a reduced diameter closed end and an enlarged diameter open end , said vessel having
      a second mechanical connection suitable for connection to said first mechanical connection, wherein when said second mechanical connection is connected to said first mechanical connection, said reduced diameter closed end is nested inside said tapered dome-shaped cover part thereby forming a cup with an open top, and
      a third mechanical connection spaced from said second mechanical connection and suitable for connection to said first mechanical connection, wherein when said third mechanical connection is connected to said first mechanical connection, said dome-shaped cover part and said cup-shaped vessel part form a chamber bounded by said recessed end and said reduced diameter closed end.

6. The convertible cup of claim 5 wherein said first connection, said second connection and said third connection each comprise threads.

7. The convertible cup of claim 5 further comprising a fourth mechanical connection for connecting to a vacuum bottle.

8. A two part convertible cup comprising:
   a dome shaped cover part with a cylindrical open end section, a tapered central section, and a cylindrical reduced diameter recessed end and having
      a first threaded mechanical connection on the inner surface of said cylindrical open end section,
      a first opening in said recessed end for dispensing of liquids,
      a second opening in said recessed end on the same plane of, generally diametrically opposed from, and of smaller size than said first opening for the intake of air to serve as a vent;
   a cup shaped vessel part of a stepped cylindrical configuration including a reduced diameter cylindrical section with a closed end sized to fit into a cup holder and an enlarged diameter cylindrical section with a gripping surface and an open end, said vessel having a second threaded mechanical connection on an outer surface of said enlarged diameter section proximate to said reduced diameter cylindrical section suitable for connection to said first threaded mechanical connection, wherein when said first threaded mechanical connection is connected to said second threaded mechanical connection, said reduced diameter cylindrical section is nested inside said dome-shaped cover part with said closed end of said cup-shaped vessel part being in close proximity to said recessed end of said dome-shaped cover part thereby forming a cup with an open top, and a third threaded mechanical connection proximate to said enlarged diameter open end suitable for connection to said first threaded mechanical connection, wherein when said first threaded mechanical connection is connected to said third threaded mechanical connection, said dome-shaped cover part rests relatively above said vessel part to form a chamber bounded by said recessed end and said reduced diameter closed end.

9. The convertible cup of claim 8 further comprising a fourth mechanical connection on an inner surface of and proximate to said open end of said enlarged diameter section of said vessel part for connection to a vacuum bottle.

10. The convertible cup of claim 9 wherein said fourth mechanical connection comprises threads.

* * * * *